United States Patent [19]

Erkki et al.

[11] Patent Number: 4,953,607
[45] Date of Patent: Sep. 4, 1990

[54] MULTISTAGE EVAPORATING SYSTEM

[75] Inventors: Kiiskilä Erkki, Karhula, Finland; Ryham Rolf, Princeton, N.J.

[73] Assignee: A. Ahlstrom, Noormarkku, Finland

[21] Appl. No.: 365,953

[22] Filed: Jun. 14, 1989

Related U.S. Application Data

[63] Continuation-in-part of Ser. No. 312,424, Feb. 17, 1989, which is a continuation of Ser. No. 110,710, Jul. 29, 1987, abandoned.

[51] Int. Cl.$^5$ .................... B01D 1/22; B01D 1/26
[52] U.S. Cl. .................... 159/13.3; 159/17.3; 159/17.4; 159/18; 159/20.1; 159/27.3; 159/49; 159/DIG. 8; 162/30.11; 162/47; 202/174; 202/236; 203/88; 203/89; 165/115
[58] Field of Search .................... 159/17.3, 17.4, 18, 159/13.3, DIG. 8, 20.1, 2.1, 23, 49, 27.3, 43.1, DIG. 32; 203/88, DIG. 9, 89, DIG. 8, 27, 22; 202/174, 236, 235; 162/47, 30.11; 165/115

[56] References Cited

U.S. PATENT DOCUMENTS

| | | | |
|---|---|---|---|
| 2,934,477 | 4/1960 | Siegfried | 202/174 |
| 3,249,517 | 5/1966 | Lockman | 159/18 |
| 3,303,106 | 2/1967 | Standiford | 159/18 |
| 3,839,160 | 10/1974 | Izumi | 202/174 |
| 3,941,663 | 3/1976 | Steinbruchel | 202/174 |
| 4,292,135 | 9/1981 | Klaren | 159/18 |
| 4,334,954 | 6/1982 | Laganá et al | 159/18 |
| 4,441,958 | 4/1984 | Teucci | 159/18 |
| 4,511,436 | 4/1985 | el Din Nasser | 202/174 |
| 4,789,428 | 12/1988 | Ryham | 202/174 |
| 4,884,767 | 5/1975 | Pottharst, Jr. | 202/174 |

*Primary Examiner*—Virginia Manoharan
*Attorney, Agent, or Firm*—Cohen, Pontani & Lieberman

[57] ABSTRACT

A thermal system includes a plurality of heat exchangers in series and the same number of flash tanks in series is interposed between two subsequent effects of a multiple effect evaporating system for sulfate black liquor. The liquor is indirectly heated in the heat exchangers by vapor produced by step-by-step expansion of the same liquor in the flash tanks and additionally by steam from an external source. To decrease the viscosity of the black liquor it is heated to a temperature of 190°–200° C. and retained in a reactor vessel for 10–20 minutes.

Preferably the flash tanks and the heat exchange elements are positioned on top of each other within a shell to form an integral construction in which the vapor compartment of each flash tank is directly connected to the vapor compartment of a corresponding one of the heat exchange elements.

8 Claims, 4 Drawing Sheets

MULTISTAGE EVAPORATING SYSTEM

RELATED U.S. APPLICATION DATA

This is a continuation-in-part of application Ser. No. 312,424, filed Feb. 17, 1989, which in turn is a continuation of Ser. No. 110,710, filed July 29, 1987, now abandoned.

FIELD OF THE INVENTION

This invention relates to the evaporation of liquors and more specifically to multistage flash evaporators having particular, but not exclusive, application to the heat treatment of black liquor from a sulfate cook to decrease the viscosity and then improve the evaporability of the black liquor to be able to drive the evaporation to higher dry solids contents than normal practice for improving the energy economics emission of $SO_2$ and the handling of the black liquor.

BACKGROUND OF THE INVENTION

When evaporating sulfate black liquor to high dry solids content (60-75%), the viscosity of the liquor increases rapidly. At the same time its evaporability decreases significantly because the black liquor adheres to the heating surface thus impairing the heat transfer to the black liquor. In order to achieve a high caloric value for combustion of the black liquor in a recovery boiler, the dry solids content should be as high as possible.

Co-pending U.S. patent application Ser. No. 312,424, the entire disclosure of which is herein incorporated by reference, suggests a method for decreasing the viscosity and improving the evaporability of sulfate black liquor. This is brought about by raising the temperature of the black liquor above the cooking temperature in a reactor so as to split the macro-molecular lignin fractions contained in the liquor.

SUMMARY OF THE INVENTION

It is an object of the present invention to provide a multiple effect evaporator system for concentrating black liquor from a sulfate cook, wherein a multistage flash evaporator and heater is interposed between two evaporation effects so as to raise the temperature of the black liquor in order to split the macro-molecular lignin fractions.

Another object of the invention is to provide an integral multistage flash evaporator and heater apparatus which is suitable for the above system but which may also be used for other purposes.

A further object is to provide a multistage flash evaporation and heater system in which a series of heat exchangers form an integral construction.

In heretofore known multistage flash evaporator and heater constructions the respective stages have been built as separate units operatively connected to each other by means of a plurality of conduits. By positioning the flash tanks and/or the heat exchange elements on top of each other within a shell to form an integral construction, most of the external conduits are eliminated and the over-all costs are reduced.

According to one embodiment of the invention, a multiple effect evaporator system for concentrating black liquor from a sulfate cook, wherein successive evaporation effects provided with heating elements are operated at successively decreasing temperatures and pressures, comprises n flash tanks connected in series and n+1 heat exchangers connected in series and a reactor vessel, the flash tanks, heat exchangers and the reactor vessel being interposed between two consecutive evaporation effects. The n flash tanks and the n heat exchangers are operatively connected to each other in such a way that the black liquor flows through the flash tank counter-currently to the flow of black liquor through the heat exchangers and that the vapors generated by expansion of the liquor heated in the heat exchangers indirectly heat the liquor. The black liquor is additionally heated by steam from an external source in the (n+1)th heat exchanger. The black liquor is retained in the reactor vessel for a period of 10-20 minutes heated to a temperature of about 190°-200° C.

According to another embodiment of the invention, a multistage flash and heater apparatus, wherein successive evaporation stages are operated at successively decreasing temperatures and pressures to generate vapor from a heated liquor or liquid, which vapors are used to heat the same or another liquor to successively increasing temperatures in successive heating stages, comprises a plurality of flash tanks and a plurality of heat exchange elements, both being connected in series and positioned on top of each other in the same shell, the number of flash tanks being the same as the number of heat exchange elements in series. The flash tanks and the heat exchanger are connected to each other in such a way that the vapor generated by expansion of the liquor in one flash tank serves as a heating medium in a corresponding one in the series of heat exchange elements.

Preferably the liquor or liquid to be heated is distributed evenly over the exterior surfaces of the uppermost heat exchange element and is caused to flow down as a thin film along the exterior surfaces of all heat exchange elements which form a continuous surface.

According to a further embodiment of the invention, a multistage flash evaporator system, wherein successive evaporation stages are operated at successively decreasing temperatures and pressures to generate vapors from a heated liquor, which vapors are used to heat the same or another liquor to successively increasing temperatures in successive heating stages, comprises a plurality of flash tanks and a plurality of heat exchange elements associated with the flash tanks, both being connected in series and the heat exchange elements being positioned on top of each other within a shell.

BRIEF DESCRIPTION OF THE DRAWINGS

For a more complete understanding of the invention and for further objects and advantages thereof, reference may now be had to the following description taken in conjunction with the accompanying drawing in which.

DESCRIPTION OF THE PRESENTLY PREFERRED EMBODIMENTS

Figure 1:
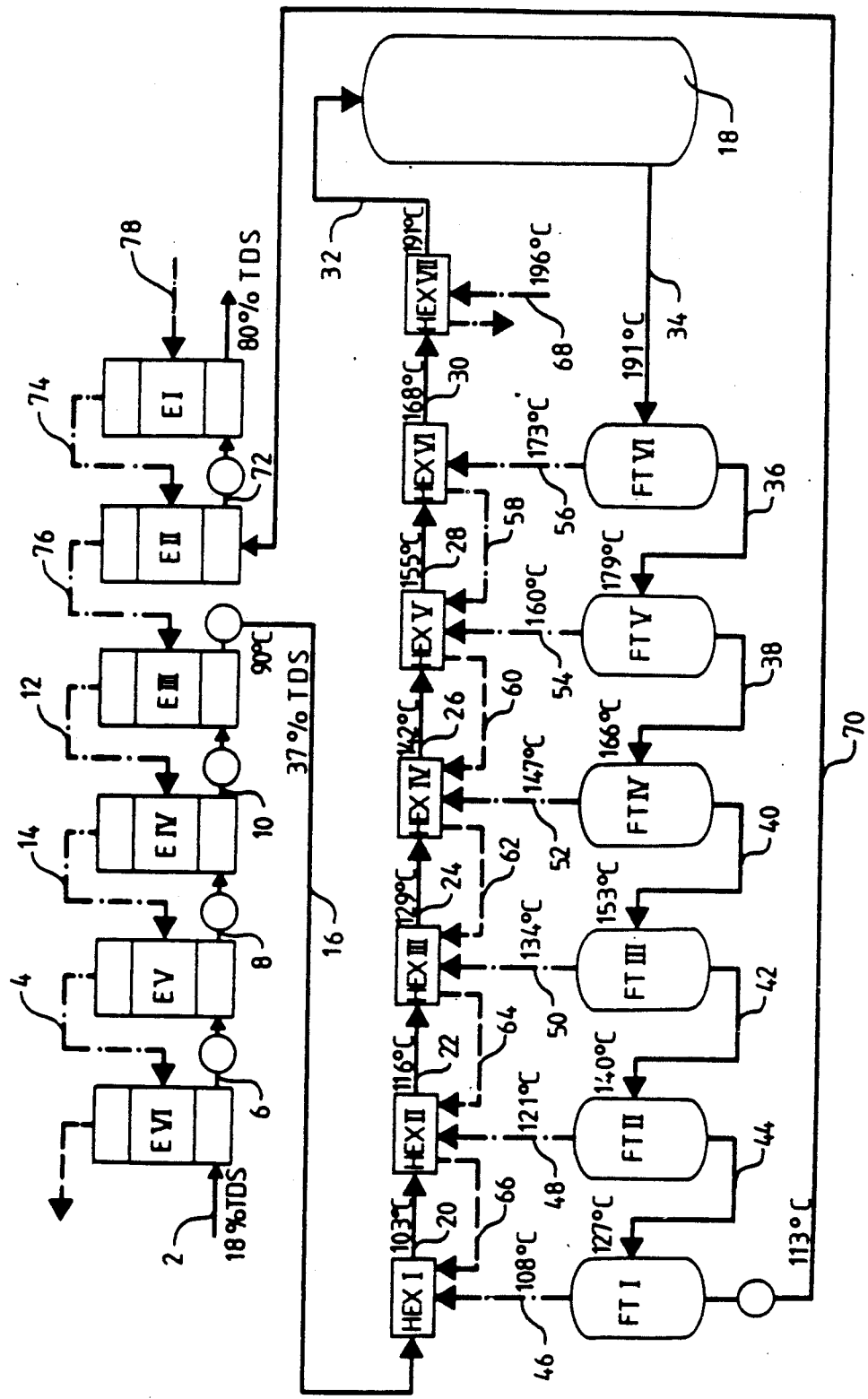
FIG. 1 is a schematic diagram of a multiple effect evaporator system according to the invention.

In FIG. 1, black liquor from a sulfate cook having a dry solids content of about 18%, which is to be concentrated by evaporation, is introduced through a line 2 into effect VI of a multiple effect evaporator system comprising six evaporator effects EI-EVI. The evaporator is of conventional type such as, for instance, a falling film evaporator according to U.S. Pat. No. 3,366,158 in which the liquor to be concentrated is recirculated over heating elements and vapors are condensed inside the heating elements to give off heat and bring about evaporation of water from the liquor and concentration of the liquor. Vapor generated by evaporation in effect EV is used as the heating fluid and passed to effect EVI through a line 4. The concentrated liquor from effect EVI is transferred to effect EV through a line 6, where it is further concentrated. Concentrated liquor is in the same way transferred from effect EV to effect EIV via a line 8 and from effect EIV to effect EIII via a line 10. The vapors from effect EIII are passed to effect EIV through a line 12 and from effect EIV to EV through a line 14. According to the invention, the black liquor the dry solids content of which has step by step increased to a value of about 40% is now transferred through a line 16 to a multistage flash evaporator and heater system comprising n+1 heat exchangers HEXI-HEXVII, n flash tanks FTI--FTVI and a reactor vessel 18. In FIG. 1 the dry solids content is shown as 37%. The heat exchangers are connected in series through lines 20, 22, 24, 26, 28 and 30 and the black liquor is successively, indirectly heated by vapor in them from a temperature of about 90° C. to a temperature of about 190° C. In FIG. 1 the temperature is indicated as 191° C. All heat exchangers except the last, HEXVII, are heated by vapors generated in the flash tanks by successive expansion of the black liquor heated in the heat exchangers. The black liquor from the last heat exchanger HEXVII in the series is transferred to the reactor vessel through a line 32 and is after a suitable retention time in the reactor vessel transferred through a line 34 to the last of the flash tanks, FTVI. The flash tanks are operatively connected in series through lines 36, 38, 40, 42 and 44 and the black liquor flows through them counter-currently to the flow of black liquor through the heat exchangers. Each flash tank includes a vapor outlet which, through a line 46, 48, 50, 52, 54 and 56 is connected to a corresponding one of the heat exchangers according to the rule: the first flash tank FTI is connected to the first heat exchanger HEXI, the second flash tank FTII to the second heat exchanger HEXII and ultimately the nth flash tank to the nth heat exchanger. Thus, all of the heat exchangers, except the (n+1)th are heated by black liquor vapors. The vapors condense in the heat exchangers and the condensate is passed to the next upstream heat exchanger in relation to the black liquor flow at a lower pressure through lines 58, 60, 62, 64 and 66. The (n+1)th heat exchanger HEXVII is supplied by fresh steam from an external source through a line 68. The pressure is gradually decreased from a pressure of about 13 bar to a pressure of about 2 bar in the flash tanks and the dry solids content of the black liquor is step by step increased through the evaporation of water in the flash tanks while the temperature is decreasing.

The black liquor which has been thermally treated to reduce the viscosity and improve the evaporability is then returned to the multiple effect evaporator system and introduced into effect EII through a line 70 to be further concentrated.

The black liquor concentrated in EII is then transferred through a line 72 to effect EI, in which it is concentrated to a dry solids content of about 80%. The vapor generated in EI is passed to EII through a line 74 and from EII to EIII through a line 76. All evaporator effects except EI, which is supplied by fresh steam through a line 78 are heated by vapors which are generated by the evaporation of water from the black liquor. The temperatures and the pressure decrease step by step in the evaporator effects in the flow direction of the heating fluid.

Figure 2:
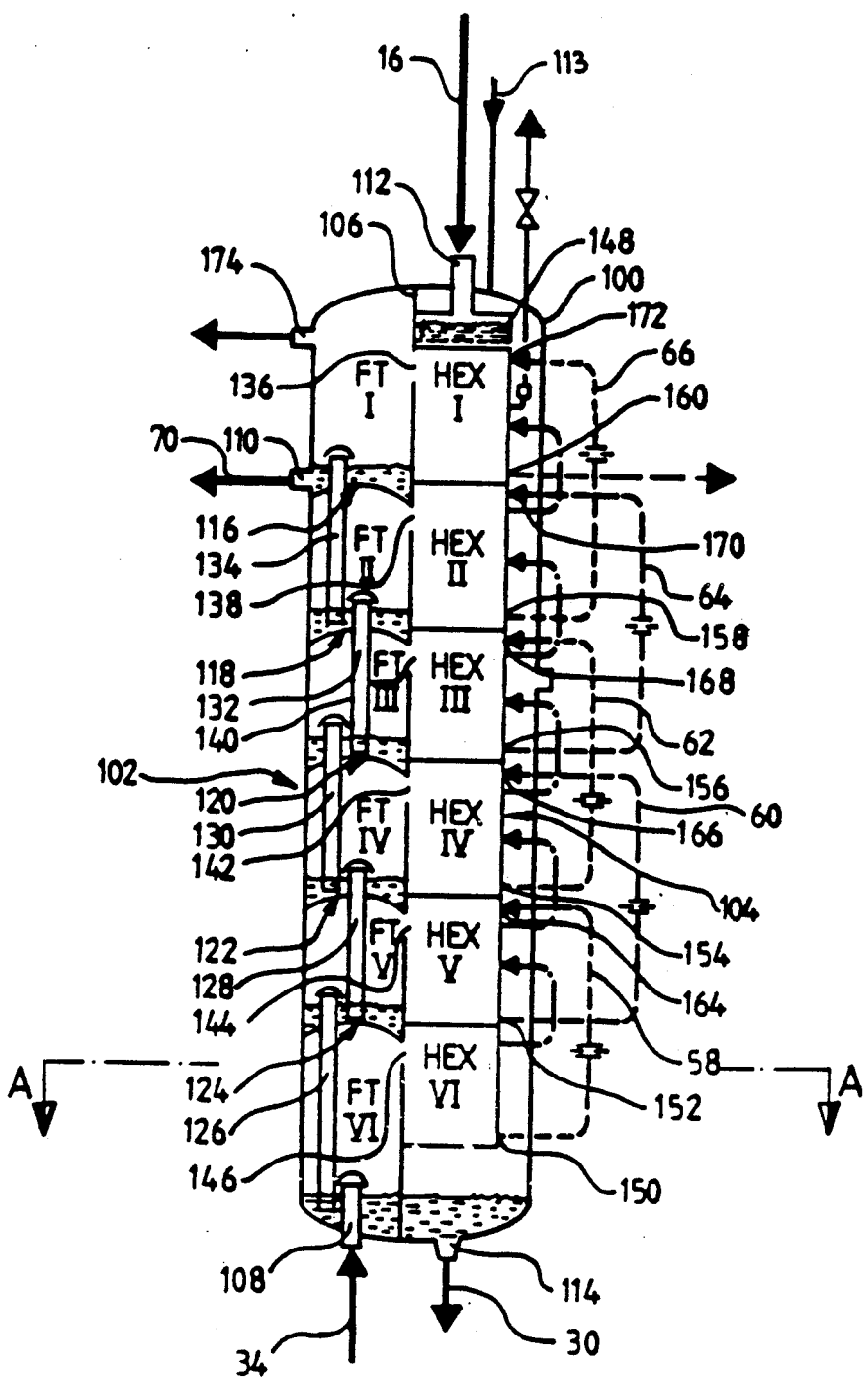
FIG. 2 is a schematic sectional view of a multistage flash evaporator and heater apparatus according to one embodiment of the invention.

FIG. 2 shows a multistage flash evaporator and heater apparatus comprising n flash tanks FT and the same number of heat exchange elements HEX in series, which are built as a unit, which is the preferred way of implementing the inventive concept embodied in the system of FIG. 1. Corresponding parts of FIG. 1 and FIG. 2 are designated by the same reference numerals. The apparatus comprises an upright cylindrical shell 100 divided into two compartments 102 and 104 by a vertical partition wall 106. The first compartment 102 has a liquor inlet 108 in the bottom of the shell and a liquor outlet 110 in the upper portion of the shell. The second compartment 104 has a liquor inlet 112 in the top of the shell and a liquor outlet 114 in the bottom of the shell.

The first compartment is divided by generally horizontal partition walls 116, 118, 120, 122 and 124 into sections which form flash tanks FTI-FTVI having a top wall and a bottom wall and being arranged on top of each other in such a way that the top wall of each flash tank, except for the uppermost FTI, constitutes the bottom wall of the flash tank positioned on top of it. Each flash tank is operatively connected to the flash tank on top of it by means of riser tubes 126, 128, 130, 132 and 134 the lower end of which is a distance apart from the bottom wall of one flash tank and the upper end a distance apart from the bottom wall of the flash tank on top of it. The vertical partition wall is provided with openings 136, 138, 140, 142, 144 and 146, which form a vapor outlet located in the upper half of each flash tank.

Heat exchange elements HEXI-HEXVI are disposed on top of each other in the second compartment. Each heat exchange element is formed of two substantially parallel plates which are connected at their edges to form a closed space. Each heating stage may comprise several heat exchange elements arranged a distance apart from each other, but only one element is shown in the drawing.

A perforated distributor tray 148 is disposed above the uppermost heat exchange element HEXI. The distributor tray receives the liquor to be heated, e.g. black liquor, from evaporator effect EIII of FIG. 1 through the inlet 112, which flows through the perforations evenly distributed over the exterior surfaces of the heat exchange element. The exterior surfaces of the heat exchange element HEXI-HEXVI form a continual surface. The liquor flows successively down as a thin film along the exterior surfaces of all heat exchange elements and is collected at the bottom of the shell. To prevent the liquor from boiling while being heated an artificial vapor pressure is applied by, for example, keeping an atmosphere of $N_2$ gas fed into shell 100 at 113 at a substantial higher pressure than the vapor pressure of the liquor at the highest temperature thus preventing the liquor from boiling. The heated liquor is discharged through outlet 114 and is transferred e.g. to the heat exchanger HEXVII of FIG. 1.

The openings 136, 138, 140, 142 and 146 in the vertical partition wall serve as inlets for vapors to the heat exchange elements HEXI-HEXVI. Each heat exchange element has an outlet 150, 152, 154, 156, 158 and 160 for condensate in its lower portion and an inlet 164, 166, 168, 170 and 172 in its upper portion which are connected to each other through lines 58, 60, 62, 64 and 66 in such a way that the outlet from HEXII is connected to the inlet of HEXI and the outlet of HEXIII is connected to the inlet of HEXII etc. Vent lines for non-condensable gases are also provided.

Liquor, e.g. thermally treated black liquor from the reaction vessel of FIG. 1, is introduced through line 34 into the lowermost flash tank FTVI through inlet 108 in the bottom of the shell. The liquor expands and a portion of the liquor is evaporated. The generated vapor is passed through the opening 146 in the partition wall to the lowermost heat exchanger HEXVI. The remaining portion of the liquor is transferred by the pressure difference between flash tanks FTVI and FTV through riser tube 126 to flash tank FTV in which again a portion of the liquor is evaporated. The liquor which has been concentrated by evaporation in the series of successive flash tanks is removed from the uppermost flash tank FTI through outlet 70 and is transferred e.g. to the evaporator effect EII of FIG. 1. Non-condensable gases are vented from flash tank FTI through an outlet 174.

Figure 3:
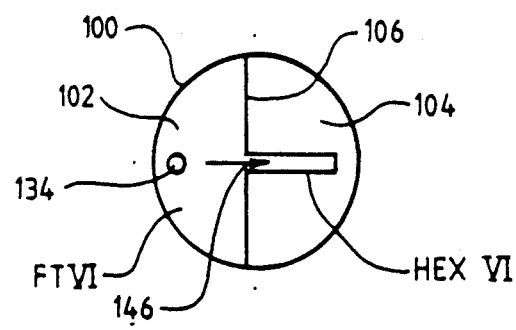
FIG. 3 is a section along line A—A of FIG. 2.

The vapor generated by expansion is, as shown in FIG. 3, introduced into the interior of the heat exchange element HEX VI and condenses therein by giving up heat to the liquor on the exterior surfaces of the heat exchange element. The liquor which flows down on the surface of the series of heat exchange elements will successively be brought into indirect heat contact with a heating vapor having a higher temperature.

As is evident when comparing FIG. 1 and FIG. 2, the lines 46, 48, 50, 52, 64 and 56 connecting the flash tanks FTI-FTVI of FIG. 1 with a corresponding one of heat exchangers HEXI-HEXVI are eliminated in the apparatus of FIG. 2, wherein the vapor outlet of the flash tank coincides with the vapor inlet of the heat exchanger. The lines 36, 38, 40, 42 and 44 connecting the flash tanks FTI-FTVI in series are substituted by the rising tubes 126, 128, 130, 132 and 134 within the shell of the apparatus shown in FIG. 2. For a better understanding of the function of the apparatus according to FIG. 2, the condensate lines 58, 60, 62, 64 and 66, are shown to be outside the shell, but it is clear that they can run entirely inside of it.

Figure 4:
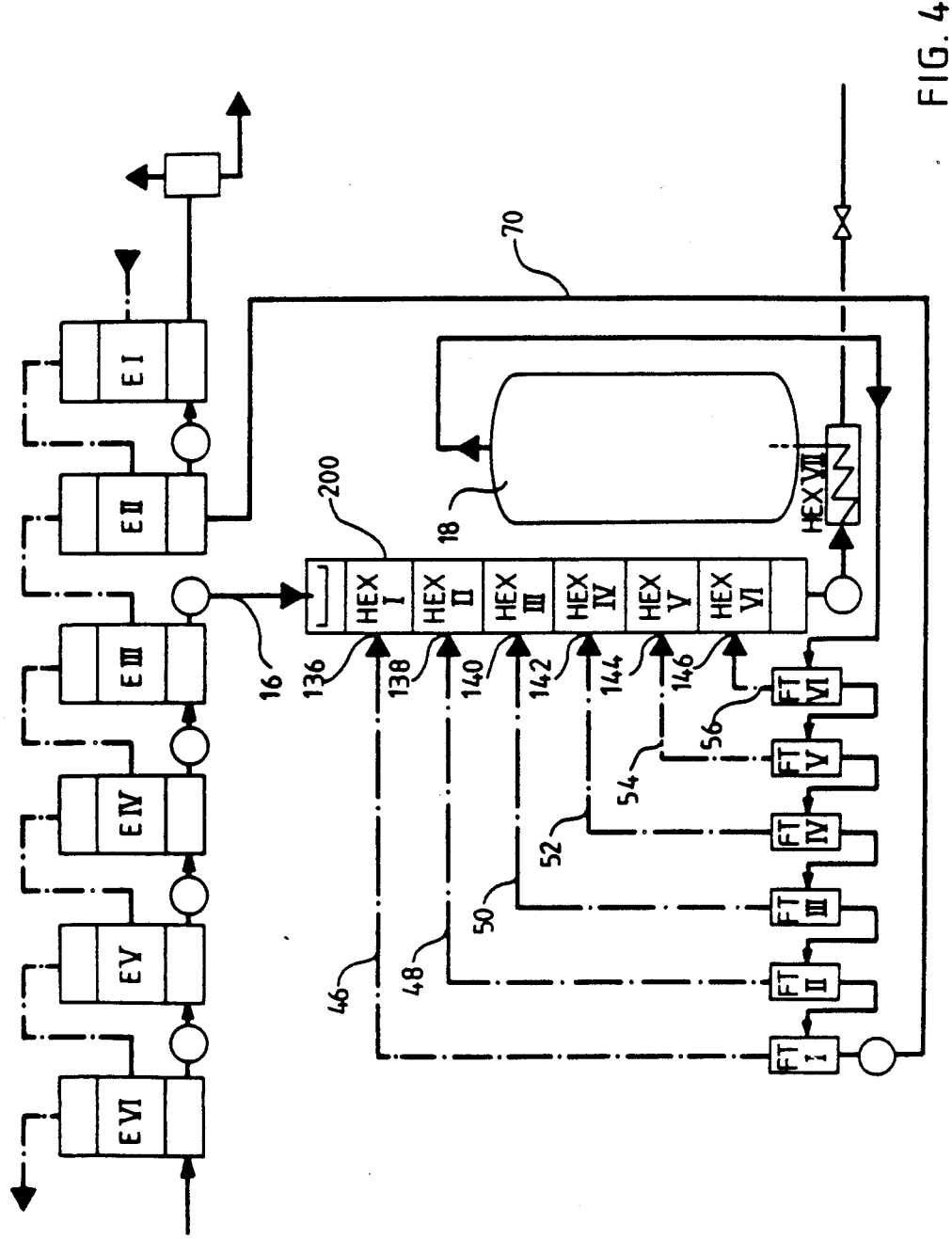
FIG. 4 is a schematic diagram of a multiple effect evaporator system in which a multistage flash evaporator and a heater apparatus according to another embodiment of the invention is used.

In the embodiment of the invention illustrated by FIG. 4, the flash tanks FTI-FTVI are separate as in FIG. 1 but the heat exchange elements HEXI-HEXVI arranged on top of each other form an integral construction within a shell 200 as in FIG. 3. Each heat exchange element has a vapor inlet 136, 138, 140, 142, 144 and 146, through which lines 46, 48, 50, 52, 54 and 56 are connected to the vapor outlets of a corresponding one of the flash tanks FTI-FTVI. The uppermost heat exchange element HEXI receives the liquor to be heated e.g. black liquor from the evaporator effect EIII of FIG. 1 through line 16 and liquor heated by vapors from the flash tanks FTI-FTVI is collected at the bottom of the shell.

The multistage flash evaporator and heater of FIG. 2 and FIG. 4 has been described in connection with a black liquor evaporation process such as, for instance, distillation of liquids.

While there has been described and illustrated a preferred embodiment of the present invention, it is apparent that numerous alterations, omissions and additions may be made without departing from the spirit and scope of the invention thereof.

What is claimed is:

1. A multiple effect evaporator system for concentrating black liquor from a sulfate cook comprising:
   a plurality of successive evaporation effects having heat elements for operation at successively decreasing temperatures and pressures;
   a plurality of flash tanks for expanding heated black liquor, comprising n flash tanks connected in series, each flash tank including a vapor outlet;
   a plurality of heat exchangers for heating the black liquor, comprising n+1 heat exchangers connected in series, including a first heat exchanger which receives black liquor from one of the evaporator effects;
   a reactor vessel for heat treatment of the black liquor comprising means for receiving black liquor from the (n+1)th heat exchanger, and means for transferring the black liquor from the reactor vessel to the nth flash tank;
   means for operatively connecting the vapor outlet of each of the flash tanks to a corresponding one in the series of heat exchangers, except to the (n+1)th heat exchanger;
   means for supplying steam from an external source to the (n+1)th heat exchanger; and
   means for transferring the black liquor from the first of the series of flash tanks to the next, in relation to the black liquor flow, downstream evaporator effect following said one of the evaporator effects.

2. A multistage flash evaporator and heater apparatus, wherein successive evaporation stages are operated at successively decreasing temperatures and pressures to generate vapors from a heated liquor, which vapors are used to heat the same or another liquor to successively increasing temperatures in successive heating stages, said apparatus comprising:
   a shell divided into a first and a second compartment by a partition wall, the first compartment having a liquor inlet in the lower portion of the shell and a liquor outlet in the upper portion of the shell, the second compartment having a liquor inlet in the upper portion of the shell and a liquor outlet in the lower portion of the shell;
   a plurality of flash tanks for expanding heated liquor disposed on top of each other within the first compartment of the shell, the top wall of each flash tank, except the uppermost, constituting the bottom wall of the flash tank positioned on top thereof, each flash tank being connected operatively to the flash tank on top thereof via a riser tube, and each flash tank having a vapor outlet;
   a plurality of heat exchange elements for heating the liquor introduced through the inlet in the upper portion of the shell by vapors generated by expansion of heated liquor in the flash tanks, and for condensing the heating vapor, said heat exchange elements being positioned on top of each other within the second compartment of the shell, each heat exchange element having a vapor inlet and a condensate outlet;

means for connecting the vapor outlet of each flash tank to the vapor inlet of a corresponding one in the series of the heat exchange elements, the number of flash tanks being the same as the number of heat exchange elements in series;

means for connecting the condensate outlet of each heat exchange element, except the uppermost, to the next, in relation to the liquor flow, upstream heat exchange element;

means for distributing the liquor on the surface of the uppermost heat exchange element; and means for passing the liquor from the heat exchange element of one stage to a subsequent stage.

3. The apparatus of claim 2, additionally comprising means for supplying an inert gas between said shell and said heat exchange elements to prevent boiling of the liquor flowing over said heat exchange elements.

4. The apparatus of claim 3, wherein each heat exchange element comprising exterior and interior surfaces and the liquor to be heated is distributed substantially evenly over the exterior surfaces of the uppermost heat exchange element and is caused to successively flow as a thin film down along the exterior surface of all heat exchange elements while heating vapors are brought into contact with the interior surfaces.

5. The apparatus of claim 2, wherein each heat exchange element comprising exterior and interior surfaces and the liquor to be heated is distributed substantially evenly over the exterior surfaces of the uppermost heat exchange element and is caused to successively flow as a thin film down along the exterior surface of all heat exchange elements while heating vapors are brought into contact with the interior surfaces.

6. The apparatus of claim 5, wherein the exterior surfaces of the heat exchange elements form a continuous surface.

7. A multistage flash evaporator and heater system, wherein successive evaporation stages are operated at successively decreasing temperatures and pressures to generate vapors from a heated liquor which vapors are used to heat the same or another liquor to successively increasing temperatures in successive heating stages, said system comprising:

a shell having an inlet in the upper portion thereof for liquor to be heated and an outlet in the lower portion of the shell for heated liquor;

a plurality of flash tanks for expanding heated liquor, each flash tank being connected in series and having a vapor outlet;

a plurality of heat exchange elements for heating the liquor introduced through the inlet by vapors generated by expansion of heated liquor in said flash tanks, and for condensing the heating vapor, said heat exchange elements being positioned on top of each other within the shell, each heat exchange element having a vapor inlet and a condensate outlet;

means for connecting the vapor outlet of each flash tank to the vapor inlet of a corresponding one in the series of heat exchange elements, the number of flash tanks being the same as the number of heat exchange elements in series;

means for connecting the condensate outlet of each heat exchange element, except the uppermost, to the next, in relation to the liquor flow, upstream heat exchange element; and means for distributing the liquor on the surface of the uppermost heat exchange element and passing the liquor from the heat exchange element of one stage to a subsequent stage.

8. The apparatus of claim 7, wherein each heat exchange element comprising exterior and interior surfaces and the liquor to be heated is distributed substantially evenly over the exterior surfaces of the uppermost heat exchange element and is caused to successively flow as a thin film down along the exterior surface of all heat exchange elements while heating vapors are brought into contact with the interior surfaces.

* * * * *

UNITED STATES PATENT AND TRADEMARK OFFICE
CERTIFICATE OF CORRECTION

PATENT NO. : 4,953,607

DATED : September 4, 1990

INVENTOR(S) : Erkki Kiiskila and Rolf Ryham

It is certified that error appears in the above-identified patent and that said Letters Patent is hereby corrected as shown below:

Face sheet, at [19] change "Erkki et al." to --Kiiskila et al.--;

At [75] change "Kiiskila Erkki, Karhula, Finland; Ryham Rolf, Princeton, N.J." to --Erkki Kiiskila, Karhula, Finland; Rolf Ryham, Princeton, N.J.--.

Signed and Sealed this

Seventh Day of January, 1992

Attest:

HARRY F. MANBECK, JR.

*Attesting Officer*          *Commissioner of Patents and Trademarks*